United States Patent [19]
Kawabata et al.

[11] Patent Number: 5,852,751
[45] Date of Patent: Dec. 22, 1998

[54] STROBE LIGHT AND IMAGE RECORDER CONTAINING THAT STROBE LIGHT

[75] Inventors: Katsunori Kawabata, Osaka; Katsumi Horinishi, Hashimoto, both of Japan

[73] Assignee: West Electric Co., Ltd., Japan

[21] Appl. No.: 879,514

[22] Filed: Jun. 20, 1997

[30] Foreign Application Priority Data

Jun. 21, 1996 [JP] Japan .................................... 8-161379
Jan. 23, 1997 [JP] Japan .................................... 9-009905

[51] Int. Cl.[6] .................................................... G03B 15/06
[52] U.S. Cl. .............................................. 316/175; 362/16
[58] Field of Search ........................... 396/62, 175, 155; 362/16–18

[56] References Cited

U.S. PATENT DOCUMENTS 5,016,032  5/1991  Haraguchi et al. .

FOREIGN PATENT DOCUMENTS 55-129326  10/1980  Japan .
60-83921   5/1985   Japan .
62-94834   5/1987   Japan .
62-264034  11/1987  Japan .
63-19834   2/1988   Japan .
2-291538   12/1990  Japan .

*Primary Examiner*—W. B. Perkey
*Attorney, Agent, or Firm*—Parkhurst & Wendel, L.L.P.

[57] ABSTRACT

By more widely diffusing light from a rod light source, particularly in the direction of the length of the rod light source than conventional strobe lights and image recorders, a strobe light of the present invention and an image recorder containing the strobe light provide luminous intensity distribution characteristics including a light emitting angle large enough to cover, for example, landscape images and the angle of coverage of imaging lenses with a short focal length. This allows the light emitting angle in the direction of the length of the rod light source to increase during wide-angle imaging, with little variation in the luminous intensity distribution characteristics in the direction at right angles to the direction of the length of the rod light source, as compared with known-arrangement strobe lights.

20 Claims, 9 Drawing Sheets

STROBE LIGHT AND IMAGE RECORDER CONTAINING THAT STROBE LIGHT

FIELD OF THE INVENTION

The present invention relates to a strobe light allowing the angle at which light from a light source illuminates an object to be varied and an image recorder containing the strobe light.

BACKGROUND OF THE INVENTION

To image an object, image recorders have widely been used including photographic cameras using photographic film as a photosensitive material and electronic cameras using electric elements as a photosensitive material. A strobe light is useful as an artificial light source for lighting in imaging an object using such an image recorder.

The strobe light comprises a light emitter, consisting of a reflector provided with a reflecting surface which is not of a truly parabolic form but of a quasi-parabolic form and planar side reflecting surfaces, all of which surfaces are next to a rectangular opening, and of a rod light source placed in space formed by the reflecting surface which is not of a truly parabolic form but of a quasi-parabolic form and planar side reflecting surfaces, and an optical member in front of the reflector of the light emitter. The strobe light is used by itself as an accessory for the image recorders mentioned above or incorporated in an image recorder.

A reflector for such strobe lights is known which has a parabolic reflecting surface setting the light emitting angle smaller than a reflector having a reflecting surface which is not of a truly parabolic form but of a quasi-parabolic form. It has been a common practice to use as an optical member a convex Fresnel lens which is arranged by dividing a surface of a condenser lens into a plurality using a plurality of concentric walls so that the Fresnel lens is plane with one optical axis and collect light.

For only a combination with a reflector having a parabolic reflecting surface, for example, the Japanese Patent Laid-Open No. 94834/1987 discloses a strobe light using a convex Fresnel lens with two optical axes, although the specific arrangement of the strobe light is unknown.

Some strobe lights are known which have means for varying the light emitting angle, which means make the luminous intensity distribution characteristics match with the angle of coverage of an imaging lens used in an image recorder by varying the light emitting angle according to the angle of coverage.

Various means for varying the light emitting angle, including those arranged to vary the position of a rod light source with respect to a reflector and those arranged to vary the positional relationship between light emitter and optical member, have been proposed or brought into practical use.

For example, a strobe light is known which is disclosed in the Japanese Patent Laid-Open No 129326/1980. FIGS. 12(a) and 12(b) show schematic cross-sectional views of the strobe light.

The strobe light comprises a known reflector 1 in a known form, consisting of a reflecting surface 1a which is not of a truly parabolic form but of a quasi-parabolic form and planar side reflecting surfaces 1b, and a rod light source 2, for example, a flash discharge tube placed in space formed by the reflecting surface 1a and the planar side reflecting surfaces 1b.

As shown in the schematic cross-sectional view of FIG. 12(b), the rod light source 2 at a distance La from the bottom of the reflector 1, that is, the bottom of the reflecting surface 1a which is not of a truly parabolic form but of a quasi-parabolic form is moved between the bottom of the reflector 1 and a position at a distance Lb from the bottom along the optical axis L of the reflector 1 to vary the positional relationship between the rod light source 2 and the reflector 1, thereby controlling the light emitting angle.

A known strobe light, disclosed in the Japanese Patent Laid-Open No. 291538/1990, has a reflector 1, a rod light source 2, and a Fresnel lens 3 positioned in front of the rectangular opening of the reflector 1, as shown in FIG. 13

In the "wide angle" mode in which wide-angle imaging is performed, the rod light source 2 at a distance Lc from the bottom of the reflector 1 and the Fresnel lens 3 at the rectangular opening of the reflector 1 are moved along the optical axis L of the reflector 1 to vary the positional relationship between the rod light source 2, reflector 1, and Fresnel lens 3, thereby controlling the light emitting angle. In the "telephoto" mode in which telephoto imaging is performed, on the other hand, the rod light source 2 is moved to the position at a distance Ld from the bottom of the reflector 1 along the optical axis of the reflector 1, and the Fresnel lens 3 is moved to the position at a distance Le from the bottom of the reflecting parabola 1 to vary the relationship above, thereby controlling the light emitting angle.

The Japanese Patent Laid-Opens No. 83921/1985 and 19834/1988 disclose strobe lights (not shown) in which a light emitter (light emitting unit) containing a rod light source and a reflector integrated with each other, is arranged to move back and forth along the optical axis of an optical member (condenser lens), thereby varying the light emitting angle.

The Japanese Patent Laid-Open No. 264034/1987 discloses a photographic camera containing the above-described strobe light that is arranged so that the light emitting angle is controlled, for example, according as the focal length of the imaging lens of the camera varies.

The luminous intensity distribution characteristics of a strobe light are designed by determining the shape of the reflector and the optical characteristics of the optical member so that the area struck by light from the strobe light is substantially rectangular, thus covering a rectangular image, since an ordinary image recorder produces a rectangular image. The luminous intensity distribution characteristics are also designed so that the light emitting angle is set larger than the angle of coverage of an imaging lens to prevent an uneven recorded image. This causes a low efficiency of use of light from a rod light source.

In recent years, "panorama size" or "hi-vision size" recorded images, that is, recorded images with a larger longitudinal dimension than conventional images have been rapidly pervading the field of photographic cameras using silver film as a photosensitive material.

Because of this, strobe lights, such as shown in FIG. 12, are required to use light from the rod light source more efficiently and have the luminous intensity distribution characteristics including a larger light emitting angle to cope with recorded images with a larger longitudinal dimension than conventional recorded images.

In the strobe light of FIG. 12, however, the distance along the axis L between the rod light source 2 and the reflector 1 is only varied between La and Lb. Such extent of variation causes the light emitting angle in the horizontal direction, or the direction of the length of the rod light source 2, to be less than that in the vertical direction, or the direction of the length of the rod light source 2. Thus control over the horizontal diffusion of light emitted from the rod light source 2 will be limited during wide-angle imaging. This poses a problem of the strobe light being inefficient in using light from the rod light source 2, although the strobe light varies the light emitting angle.

The strobe light in FIG. 13 moves either the rod light source 2 or the reflector 1 along the optical axis L so that the distance between these two components decreases and also moves the Fresnel lens 3 forward to vary the light emitting angle. Because of this, the strobe light in FIG. 13 seems to a little better control the horizontal diffusion of light from the rod light source 2 during wide-angle imaging than the strobe light in FIG. 13. However, the strobe light in FIG. 13 is larger than that in FIG. 12 by the volume produced by the displacement Le of the Fresnel lens 3. Thus the strobe light in FIG. 13 has a problem of being too large, although it is of variable light emitting angle type.

In the Japanese Patent Application No. 7-237957, the inventor proposed a variable light emitting angle strobe light (not shown) which was invented to solve the problems described above. The strobe light features a reflector opening whose dimension in the direction of the length of a rod light source varies with the position of the rod light source with respect to the reflector.

When increasing the light emitting angle to cope with wide-angle imaging, the proposed strobe light moves the rod light source away from the bottom of the reflector along its optical axis. At the same time, the strobe light also moves the side reflecting members of the reflector so that the reflector opening dimension in the direction of the length of the rod light source decreases. Conversely, when reducing the light emitting angle to cope with telephoto imaging, the strobe light moves the rod light source along the axis of the reflector toward its bottom and also moves the side reflecting members so that the reflector opening dimension mentioned above increases. This operation allows the efficiency of use of light from the rod light source to increase Moreover, because the Fresnel lens does not move, the strobe light can be reduced in size.

A detailed study of control over light from the rod light source of the variable light emitting angle strobe light above has shown, however, that control over the horizontal diffusion of light emitted from the rod light source remains limited during wide-angle imaging. This makes it extremely difficult to provide luminous intensity distribution characteristics including a light emitting angle which covers the angle of coverage of an imaging lens with a focal length shorter than a certain focal length, especially to increase the light emitting angle in the direction of the length of the rod light source during wide-angle imaging.

DISCLOSURE OF THE INVENTION

It is an object of the present invention, made to solve the problems above, to provide a strobe light that, unlike a conventional known strobe light, can increase the light emitting angle in the direction of the length of a rod light source during wide-angle imaging with little variation in the luminous intensity distribution characteristics in the direction at right angles to the direction of the length of the rod light source and to provide an image recorder containing that strobe light.

To this end, a strobe light, described in claim 1 herein, which allows the angle at which light from a light source illuminates an object it to change, comprises at least a light emitter consisting of a reflector provided with a reflecting surface which is not of a truly parabolic form but of a quasi-parabolic form and planar side reflecting surfaces, all of which surfaces are next to a rectangular opening, and of a rod light source positioned in space formed by the reflecting surface which is not of a truly parabolic form but of a quasi-parabolic form and the planar side reflecting surfaces; an optical member positioned in front of the reflector, first and second condenser lenses of which member are formed on both sides of a first reference line crossing the rod light source at right angles substantially at its center in its longitudinal direction; and light emitting angle varying means for varying light emitted through the optical member from the light emitter, the optical member being arranged to hardly diffuse light from the rod light source in the direction at right angles to the direction of the length of the rod light source and widely diffuses the light in the direction of the length of the rod light source, compared with the case where the optical member has either the first condenser lens or the second condenser lens.

A strobe light, described in claim 2 herein, which allows the angle at which light from a light source illuminates an object to change, comprises at least a light emitter consisting of a reflector provided with a reflecting surface which is not of a truly parabolic form but of a quasi-parabolic form and planar side reflecting surfaces, all of which surfaces are next to a rectangular opening, and of a rod light source positioned in space formed by the reflecting surface which is not of a truly parabolic form but of a quasi-parabolic form and the planar side reflecting surfaces; an optical member positioned in front of the reflector, first and second condenser lenses of which member are formed on both sides of a first reference line crossing the rod light source at right angles substantially at its center in its longitudinal direction; and light emitting angle varying means for varying light emitted through the optical member from the light emitter, the optical member being arranged to hardly diffuse light from the rod light source in the direction at right angles to the direction of the length of the rod light source when the distance between the rod light source and the optical member is long and widely diffuses the light when the distance is short.

A strobe light, described in claim 3 herein, which allows the angle at which light from a light source illuminates an object to change, comprises at least a light emitter consisting of a reflector provided with a reflecting surface which is not of a truly parabolic form but of a quasi-parabolic form and planar side reflecting surfaces, all of which surfaces are next to a rectangular opening, and of a rod light source positioned in space formed by the reflecting surface which is not of a truly parabolic form but of a quasi-parabolic form and the planar side reflecting surfaces; an optical member positioned in front of the reflector, first and second condenser lenses of which member are formed on both sides of a first reference line crossing the rod light source at right angles substantially at its center in its longitudinal direction; and light emitting angle varying means for varying light emitted through the optical member from the light emitter, the first and second condenser lenses being arranged to have tops, positioned apart from each other by ½ or less of the longitudinal dimension of the rectangular opening of the reflector as measured during wide-angle imaging, and curved lens surfaces next to the tops.

An image recorder of the present invention, which records an image corresponding to an imaged object, contains the strobe light described in claim 1, which is arranged to operate to light up an object to be imaged.

An image recorder of the present invention, which records an image corresponding to an imaged object, contains the strobe light described in claim 2, which is arranged to operate to light up an object to be imaged.

An image recorder of the present invention, which records an image corresponding to an imaged object, contains the strobe light described in claim 3, which is arranged to operate to light up an object to be imaged.

By more widely diffusing light from a rod light source than conventional strobe lights, particularly in the direction of its length, a strobe light arranged as described above provides luminous intensity distribution characteristics including a light emitting angle large enough to cover, for example, landscape images and the angle of coverage of imaging lenses with a short focal length.

A preferred embodiment of the present invention can provide luminous intensity distribution characteristics including a large light emitting angle in the direction of the length of a rod light source, since the embodiment more widely diffuses light from the rod light source, particularly in the direction of its length than conventional strobe lights to cope with a landscape image or an imaging lens with a short focal length.

Thus the light emitting angle in the direction of the length of a rod light source can be increased during wide-angle imaging, with less variation in the luminous intensity distribution characteristics in the direction at right angles to the direction of the length of the rod light source, as compared with known-arrangement strobe lights.

DESCRIPTION OF THE EMBODIMENTS

Figure 1:
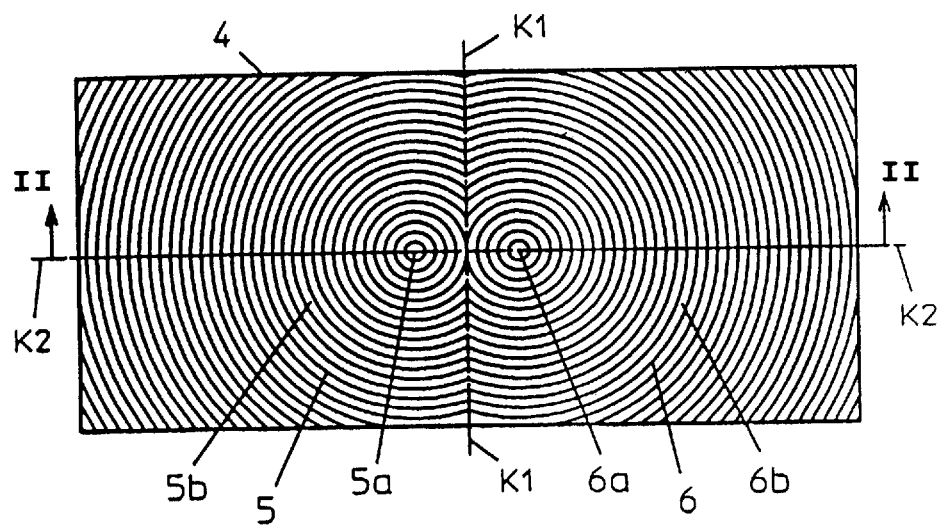
FIG. 1 is a schematic front view illustrating an example of an optical member, a major part of a first embodiment of a strobe light according to the present invention.
Figure 2:
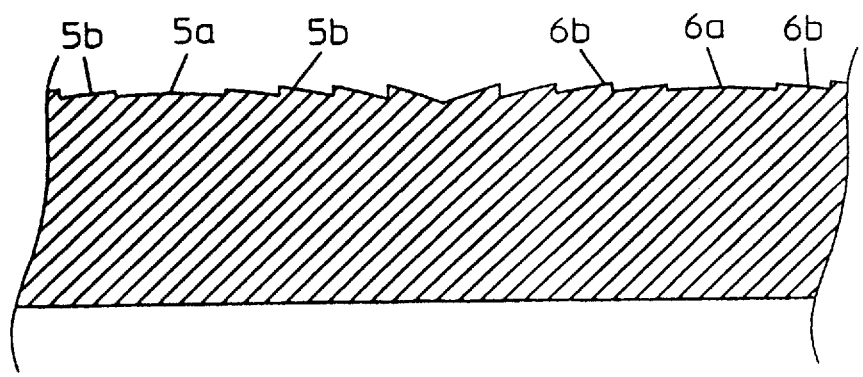
FIG. 2 is a schematic cross-sectional view taken along line II—II in the schematic front view of FIG. 1.

FIGS. 1 and 2 schematically show an optical member, a major part of a first embodiment of a strobe light according to the present invention, FIG. 1 being a schematic front view of the optical member, and FIG. 2 being a schematic enlarged view of the middle of the cross section taken on line II—II in the schematic front view of FIG. 1.

Figure 12A:
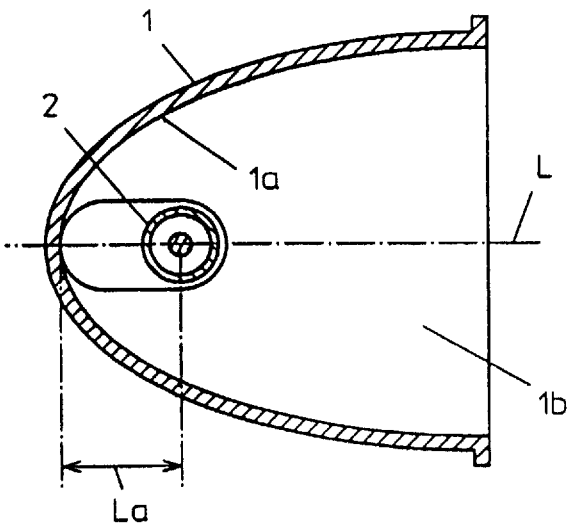
FIGS. 12(a) and 12(b) are schematic cross-sectional views illustrating a conventional variable light emitting angle strobe light.
Figure 12B:
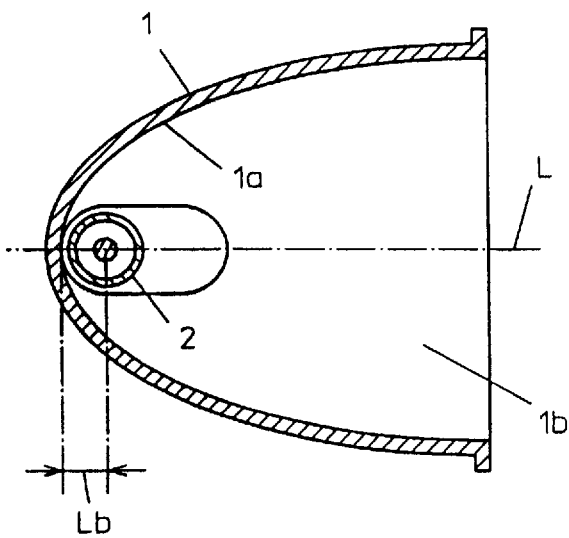
Figure 13:
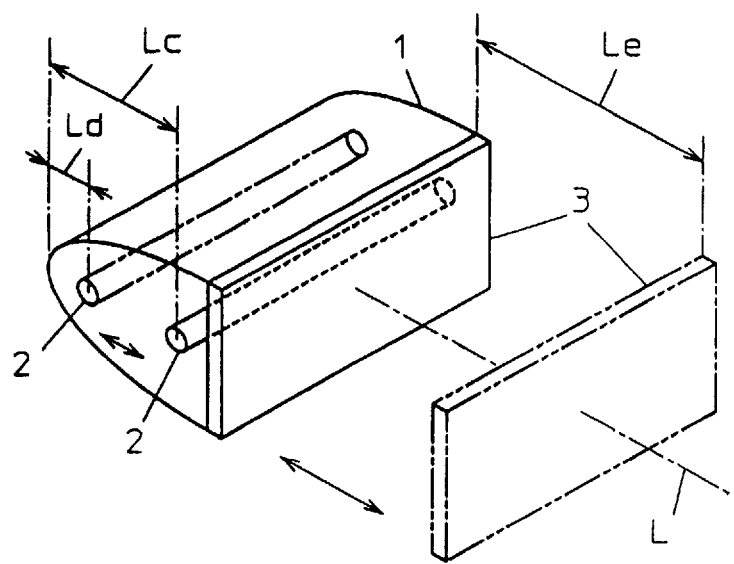
FIG. 13 is a schematic perspective view illustrating the conventional variable light emitting angle strobe light.

In the first embodiment of the strobe light according to the present invention, the optical member 4 in FIGS. 1 and 2 is positioned in front of a known light emitter having means for varying the light emitting angle, for example, the means in FIGS. 12 and 13. That is, the optical member 4 is arranged by installing, for example, an external box (not shown), forming an enclosure so that the light emitting angle can be varied, in front of a light emitter consisting of a reflector having a reflecting surface which is not of a truly parabolic form but of a quasi-parabolic form and planar side reflecting surfaces, all of which surfaces are next to an rectangular opening, and of a rod light source positioned in the direction of the length of the rectangular opening in space formed by the reflecting surface which is not of a truly parabolic form but of a quasi-parabolic form and the planar side reflecting surfaces.

The optical member 4, which is substantially rectangular to completely cover the rectangular opening, is arranged, with a first condenser lens 5 and a second condenser lens 6 formed on both sides of a first reference line K1, crossing the rod light source at right angles through nearly the center in the direction of the length of the rod light source.

The optical member 4, consisting of the first condenser lens 5 and second condenser lens 6, is formed to hardly diffuse light from the rod light source in the direction at right angles to the direction of the length of the rod light source, compared with the case where either of the first and second condenser lenses 5 and 6 is provided and to diffuse much of the light in the direction of the length of the rod light source. Specifically, the first and second condenser lenses 5 and 6 have appropriately spaced tops 5a and 6a and curved lens surfaces 5b and 6b next to the tops.

The distance between the tops 5a and 6a is set based on the longitudinal dimension of the rectangular opening. It is preferably equal to or less than ½ of the longitudinal dimension of the rectangular opening as measured in wide-angle imaging.

The curved lens surfaces 5b and 6b are formed by dividing lens surfaces into a plurality using a plurality of concentric walls. Thus the optical member 4 is arranged as a Fresnel lens and reduced in size and thickness.

The first reference line K1 is arranged to cross the optical member 4 at right angles at its longitudinal center. That is, the first and second condenser lenses 5 and 6 are arranged so that the optical member is symmetrical about the first reference line K1 Thus the first reference line K1 is easy to align with the straight line crossing the rectangular opening at right angles at its center in the direction of the length of the rod light source, that is, at its longitudinal center when the optical member 4 is positioned in front of the light emitter.

The first and second condenser lenses 5 and 6 are formed from aspheric lenses with the same convergence characteristic. The tops 5a and 6a are arranged so that they are on a second reference line K2 crossing the rectangular opening at right angles at its transverse center.

The optical member 4 is positioned so that the first reference line K1 is aligned with the straight line crossing the rectangular opening at right angles at its longitudinal center.

The optical member 4 is compared in arrangement with a Fresnel lens with a known arrangement (hereinafter called the conventional Fresnel lens), provided with a condenser lens having a top and the same convergence characteristic, dimensions, and structure as the first and second condenser lenses 5 and 6

At the ends of the optical member 4 in the direction at right angles to the direction of the length of the rod light source, a curved lens surface is formed which has a somewhat sharp slope. At the ends of the optical member at the direction of the length of the rod light source, a curved lens surface is formed which has a gentler slope.

This allows the optical member to well control light from the rod light source in the direction of the length of the rod light source and the direction at right angles to that direction and diffuse the light more widely, or more efficiently, than the conventional Fresnel lens. Thus luminous intensity distribution characteristics with a wider light emitting angle can be set which can cover not only landscape image recording but the angle of coverage of imaging lenses with a short focal length.

Referring now to the luminous intensity distribution curves 3(a) and 3(b) in FIGS. 3(a) and 3(b), constructed in testing a test strobe light arranged as described above, the luminous intensity distribution characteristics of a strobe light with the optical member 4 arranged as described above is explained below.

Figure 3A:
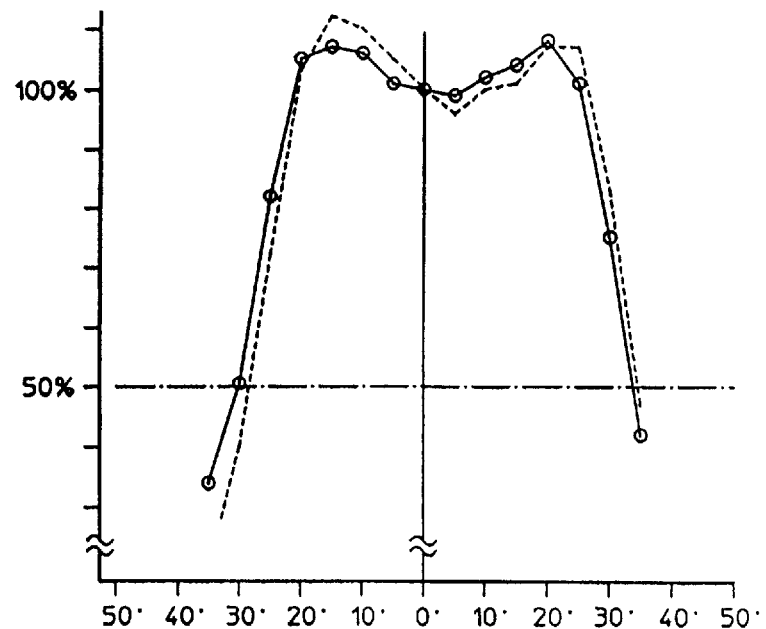
FIGS. 3(a) and 3(b) are luminous intensity distribution characteristic curves obtained with the first embodiment, curve FIG. 3(a) representing a luminous intensity distribution characteristic for the direction at right angles to the direction of the length of a rod light source, and curve FIG. 3(b) representing a luminous intensity distribution characteristic for the direction of the length of the rod light source.
Figure 3B:
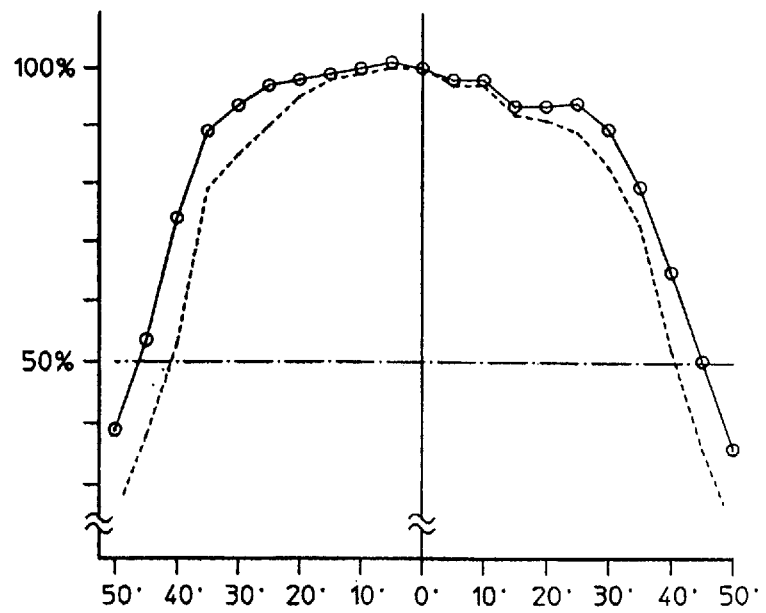

The test strobe light whose luminous intensity distribution characteristics are represented by curves 3(a) and 3(b) in FIGS. 3(a) and 3(b) use a flash discharge tube 28.5 mm in discharge length and 3.5 mm in outside diameter as a rod light source.

The strobe light also uses as the optical member 4 a Fresnel lens in which the curved surfaces of the first and second condenser lenses 5 and 6 are formed with an aspheric lens surface having the same convergence characteristic as a condenser lens with a focal length of 28 mm. The Fresnel lens is 75.4 mm×35.5 mm and 4.2 mm thick and has tops 5a and 6a 10 mm apart from each other. A plurality of walls divide the aspheric lens surface into a plurality at intervals of 0.5 mm.

A reflector having a reflecting surface which is not of a truly parabolic form but of a quasi-parabolic form and planar side reflecting surfaces, all of which surfaces are next to an rectangular opening, is made of plates 0.3 mm thick. The reflector is 7 mm deep and 29 mm long at its bottom. The rectangular opening of the reflector is 12.1 mm×33.5 mm.

The optical member 4 and reflector are positioned so that their longitudinal and transverse center lines are aligned with each other as viewed from the front. The optical member 4 is positioned to be in contact with the rectangular opening surface. Only the middle of the optical member 4 is used for lighting control.

The flash discharge tube is positioned 1.6 mm away from the bottom surface of the reflector.

Curve 3(a) in FIG. 3(a) shows the luminous intensity characteristic for the direction at right angles to the direction of the length of the rod light source, or the flash discharge tube, and curve 3(b) in FIG. 3(b) shows the luminous intensity distribution characteristic in the direction of the length of the rod light source.

Broken lines in FIG. 3 show luminous intensity distribution characteristics obtained with a strobe light having a known structure, which is arranged by replacing the optical member 4 in the test strobe light with the conventional Fresnel lens having a top and the same structure as the optical member 4.

Generally, the light emitting angle is an angle at which fifty percent of the oncoming light intensity is obtained when the luminous intensity distribution characteristics described above are exhibited. Table 1 gives only angles at which fifty percent of the oncoming light intensity is obtained.

TABLE 1

|  | Left | Right | Total | Upper | Lower | Total |
| --- | --- | --- | --- | --- | --- | --- |
| Test strobe light | 46.3 | 45.1 | 91.4 | 30.1 | 33.7 | 63.8 |
| Known-structure strobe light | 41.0 | 40.7 | 81.7 | 28.3 | 34.5 | 62.8 |

Unit: degree (°)

As is obvious from curve 3(a) in FIG. 3(a) and Table 1, the test strobe light and the known-structure strobe light have almost the same luminous intensity distribution characteristics for the direction at right angles to the direction of the length of the rod light source.

That is, the test strobe light's luminous intensity distribution characteristics for the direction at right angles to the direction of the length of the rod light source, or for the vertical direction, are equivalent to an upper lighting angle of 30.1°+ a lower light emitting angle of 33.7°=63.8°, as viewed from the front, while the known-structure strobe light's luminous intensity distribution characteristics for the same direction are equivalent to an upper light emitting angle 28.3°+ a lower light emitting angle of 34.5°=62.8°. This shows that the test strobe light does not differ much in luminous intensity distribution characteristics from the known-structure strobe light and that both strobe lights well control light from the rod light source.

As is clear from curve 3(b) in FIG. 3(b) and Table 1, unlike the luminous intensity distribution characteristics for the direction at right angles to the direction of the length of the rod light source, the luminous intensity distribution characteristics for the direction of the length of the rod light source differ much between test strobe light and known-structure strobe light.

That is, the test strobe light's luminous intensity distribution characteristics for the direction of the length of the rod light source, or for the horizontal direction, are equivalent to a left light emitting angle of 46.30°+ a right light emitting angle of 45.1°=91.4°, as viewed from the front, while the known-structure strobe light's luminous intensity distribution characteristics for the same direction are equivalent to a left light emitting angle of 41.0°+ a right light emitting angle of 40.7°=81.7°. This shows that the test strobe light diffuses light from the rod light source more widely in the horizontal direction than the known-structure strobe light.

Taken together, the test strobe light is expected to have sufficient luminous intensity distribution characteristics to cover not only landscape image recording but the angle of coverage of imaging lenses with a shorter focal length.

Specifically, for example, an imaging lens with a focal length of 24 mm, whose horizontal angle of coverage is about 74°, is required to have a horizontal light emitting angle a little larger than 74°, for example, a horizontal light emitting angle of about 74°+2.5°+2.5°=79° for a variable light emitting angle strobe light containing the imaging lens to cover an angle of coverage of about 74°.

From a standpoint of product design, taking into account variations during production, a product needs to be designed so that a light emitting angle of about 84°, which is a little larger than the required light emitting angle, can be set.

For the luminous intensity distribution characteristics for the direction of the length of the rod light source, the light emitting angle of the known-structure strobe light can only be set to 81.7°, which is smaller than about 84°. Thus the light emitting angle cannot cover the angle of coverage of an imaging lens with a focal length of 24 mm. On the other hand, the light emitting angle of the test strobe light can be set to 91.4°, which is larger than about 84°, and thus the test strobe light covers an imaging lens with a focal length of 24 mm.

In other words, curves 3(a) and 3(b) in FIGS. 3(a) and 3(b) also show that the optical member of the test strobe light is expected to emit more light than that of the known-structure strobe light if the test strobe light and known-structure strobe light have the same luminous intensity distribution characteristics.

Below is discussed the relationship between the distance between the tops 5a and 6a of the first and second condenser lenses of the optical member 4 and the luminous intensity distribution characteristics, particularly the luminous intensity distribution characteristics for the direction of the length of the rod light source.

The inventor has confirmed that the light emitting angle representing the luminous intensity distribution characteristics for the direction of the length of the rod light source is larger for the test strobe light than for the known-structure strobe light having the optical member with one top when the tops 5a and 6a are 1 mm, equivalent to two intervals, away from each other.

The inventor has also confirmed, however, that a problem arises for light emitting angles other than the light emitting angle described above when the distance between the tops 5a and 6a is larger than a certain value.

As the distance between the tops 5a and 6a increases, the light emitting angle in the direction of the length of the rod light source gradually becomes larger, thus providing preferable luminous intensity distribution characteristics In this case, however, the luminous intensity distribution characteristic curve, which gently and continuously falls, changes so that it is particularly gentle in part.

When the distance between the tops 5a and 6a further increases, such characteristic curve changes to a one having a second peak where the above-mentioned gentle part has an area with higher light intensity at a location outer from the directly opposing direction.

Obviously, the luminous intensity distribution curve with the second peak is not preferable, since the luminous intensity distribution characteristics represented by the curve cause uneven brightness during "bounce imaging" in which the light emitter is rotated in the direction of the length of the rod light source.

In addition, while it is not mentioned in the above, the inventor has further confirmed that brightness itself slightly decreases with increasing distance between the tops 5a and 6a.

The inventor has still further confirmed that almost the same luminous intensity distribution characteristics as those represented by curves 3(a) and 3(b) in FIGS. 3(a) and 3(b) can be obtained with rod light sources and reflectors of different sizes when the optical member 4 and the like are used.

The confirmations above have shown that the distance between the tops 5a and 6a is preferably equal to or less than ½ of the dimension of the reflector opening in the direction of the length of the rod light source as measured in wide-angle imaging, that is, the longitudinal dimension of the reflector opening to diverge light from the rod light source in the direction of the length of the rod light source.

The inventor has still further confirmed that the distance between the tops between 5a and 6a should be set to 0.2 to 0.4, with the dimension of the reflector opening in the direction of the length of the rod light source as measured in wide-angle imaging assumed to be 1, to adapt the luminous intensity distribution characteristics in terms of the light emitting angle and brightness to cover the angle of coverage of an imaging lens with a focal length of 24 mm. In other words, preferable luminous intensity distribution characteristics can be obtained in terms of the light emitting angle, characteristic curve profile, and brightness in the reflector opening dimension range of 0.2 to 0.4.

The first embodiment of a strobe light according to the present invention comprises an optical member having the structure and optical characteristic described above and means for varying the light emitting angle. Thus when the state where the luminous intensity distribution characteristics are obtained as the state for wide-angle imaging, luminous intensity distribution characteristics including a sufficiently large light emitting angle can be provided for not only a landscape image but a wide-angle image to be produced with an imaging lens having a short focal length and a large angle of coverage.

In the first embodiment, the tops 5a and 6a of the first and second condenser lenses 5, 6 constituting the optical member are positioned on the second reference line K2. The present invention, however, is not limited to such an arrangement. Taking desired luminous intensity distribution characteristics into account, the tops 5a and 6a may be positioned above or below the second reference line K2, for example.

In the first embodiment, the first reference line K1 of the optical member 4 is designed to cross the optical member 4 at right angles at its center in the direction of its length so that the first condenser lens 5 and the second condenser lens 6 are symmetrical. The present invention, however, is not limited to such an arrangement. Taking desired luminous intensity distribution characteristics into account, the first reference line K1 may be designed to cross the optical member 4 at an appropriate distance from its center in the direction of its length. The first embodiment can of course be designed so that the first and second condenser lenses 5 and 6 are asymmetric, that is, they have different optical characteristics.

The first embodiment is arranged by using a Fresnel lens as the optical member 4. If it is extremely difficult to produce the optical member 4 as a Fresnel lens, if the optical member 4 is not much reduced in thickness by forming it as a Fresnel lens, or if the dimensions of the reflector opening must significantly be reduced to use the reflector for the light emitter of a small photographic camera, it goes without saying that the first and second condenser lenses 5 and 6 may be arranged as a curved lens surface instead of forming the optical member 4 as a Fresnel lens.

Figure 4:
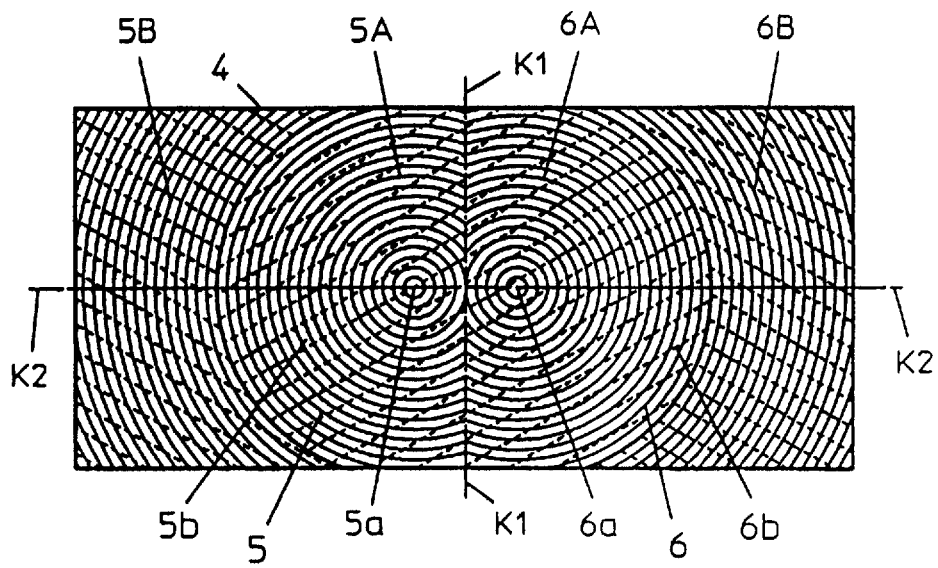
FIG. 4 is a schematic front view illustrating another example of the optical member, a major part of the first embodiment of a strobe light according to the present invention.

FIG. 4 is a schematic front view illustrating another optical member, a major part of a strobe light according to the present invention. Components designated by the same numerals as in FIG. 1 have the same function.

The optical member 4 in the present embodiment differs from the optical member 4 in the first embodiment in terms of the arrangement of the first and second condenser lenses.

The optical member in FIG. 4, whose first and second condenser lenses comprises first optics portions 5A and 6A having at least tops 5a and 6a respectively and a first convergence characteristic, which are shaded by parallel broken lines upward to the right in FIG. 4, and second optics portions 5B and 6B positioned next to the first optics portions 5A and 6A and having a second convergence characteristic different from the first convergence characteristic. The second optics portions are shaded by parallel broken lines downward to the right in FIG. 4.

Thus the optical member 4 in FIG. 4, of course, has the same effect as the optical member 4 in the first embodiment, and choosing different convergence characteristics using the first optics portions 5A and 6A and the second optics portions 5B and 6B allows the diffusion of light from the rod light source to be controlled more freely.

The optical member 4 in the present embodiment is given two convergence characteristics, but more than two convergence characteristics may be given.

Taking desired luminous intensity distribution characteristics into account, the tops 5a and 6a may be positioned above or below the second reference line K2, as in the first embodiment. The first reference line K1 may be designed so that it does not cross the optical member 4 at right angles at its center in the direction of its length.

If it is extremely difficult to produce the optical member 4 as a Fresnel lens, the optical member 4 may be arranged to have a continuous curved lens surface.

Figure 5:
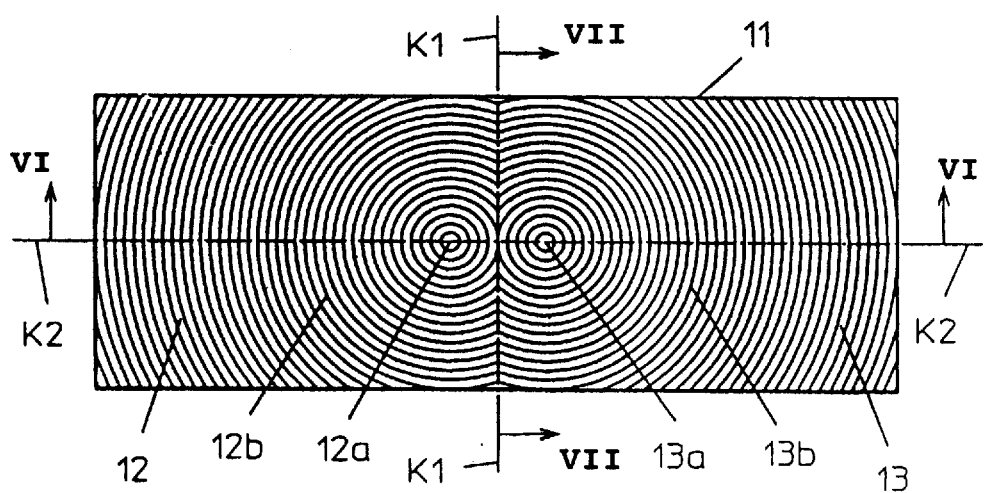
FIG. 5 is a schematic front view illustrating a light emitter, a major part of a second embodiment of a strobe light according to the present invention.
Figure 6:
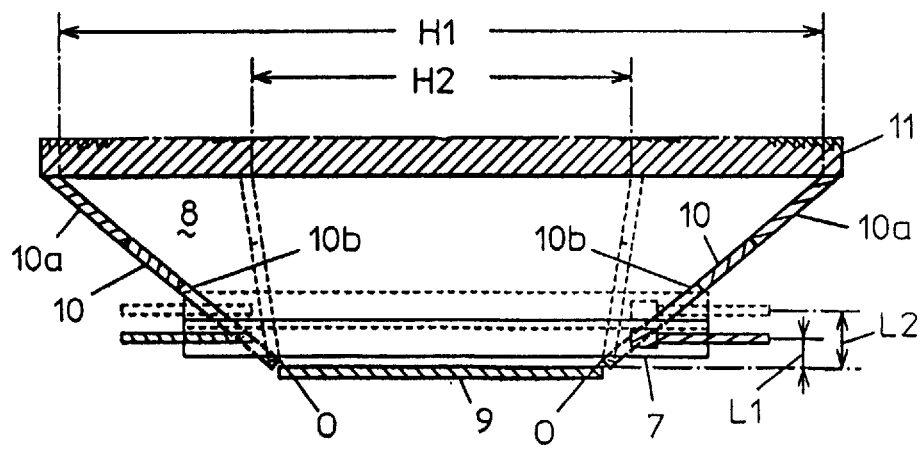
FIG. 6 is a schematic cross-sectional view taken along line VI—VI in the schematic front view in FIG. 5.
Figure 7:
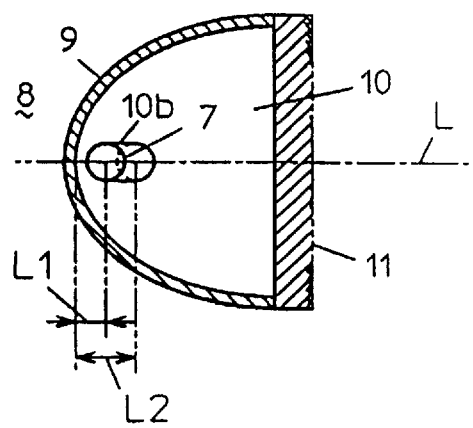
FIG. 7 is a schematic cross-sectional view taken along line VII—VII in the schematic front view in FIG. 5.

FIGS. 5, 6, and 7 schematically show a light emitter, a major part of a second embodiment of a strobe light according to the present invention, FIG. 5 being a schematic front view, FIG. 6 being a schematic cross-sectional view take on line II—II in FIG. 5, and FIG. 7 being a schematic cross-sectional view taken on line VII—VII in FIG. 5.

The second embodiment, described in detail later, of a strobe light according to the present invention is arranged so that the light emitting angle can be varied by moving not only a rod light source but the side reflecting panels of a reflector.

As shown in FIG. 6, the rod light source 7 in the second embodiment is accommodated in a reflector a comprising a fixed center panel 9 with a cross section which is mostly represented by a substantial parabola; a pair of side reflecting panels 10, positioned opposite to each other on both sides of the fixed center panel; and fixed side reflecting sections 10a. The rod light source and the reflector 8 constitute a light emitter.

The rod light source 7 is provided on the optical axis of the reflector 8 so that the source can move between a position at which luminous intensity distribution characteristics for telephoto imaging are set; that is, a position at a distance L1 from the bottom of the fixed center plate 9, constituting a part of the reflector 8, and a position at which luminous intensity distribution characteristics for wide-angle imaging are set; that is, a position at a distance L2 from the bottom of the reflector 8.

The pair of side reflecting panels 10, constituting the reflector 8 together with the fixed center panel 9 and others, are provided with grooves 10b for moving the rod light source 7 along the optical axis 2 of the reflector 8. The reflector is arranged so that the dimension of its opening, measured in the direction of the length of the rod light source 7, can be varied between H1, a longer dimension indicated by a solid line in FIG. 6, and H2, a shorter dimension indicated by a broken line in the FIG., by rotating the side reflecting panels with an appropriate position on the bottom of the fixed center panel 9 as a center of rotation O.

The pair of side reflecting panels 10 are rotated around the center of rotation O as the position of the rod light source 7 varies with respect to the reflector 8. The second embodiment therefore varies the light emitting angle in the same way as the strobe light proposed by the inventor, which is described early herein.

In practice, when the light emitting angle is increased, as indicated by solid and broken lines in FIGS. 6 and 7, to perform wide-angle imaging, the rod light source 7 is moved toward the position at a distance L2 from the bottom of the reflector 8, indicated by a broken line, and the side reflecting panels 10 are moved so that they set the opening dimension to H2 as indicated by a broken line also. Conversely, when the light emitting angle is reduced to perform telephoto imaging, the rod light source 2 is moved toward the position at the distance L1 from the bottom of the reflector 8, and the side reflecting panels 10 are moved so that they set the opening dimension to H1 in cooperation with the fixed side reflecting sections 10a.

An optical member 11 provided with a first condenser lens 12 and a second condenser lens 13 is installed in front of the rectangular opening of the reflector 8, formed by the fixed center panel 9, side reflecting panels 10, and fixed side reflecting sections 10a.

The optical member 11 in the second embodiment is attached to an external box (not shown) forming an enclosure The optical member 11 is basically arranged in the same way as the optical member 4 in the first embodiment 1, described referring to FIG. 1.

That is, the optical member 11 is arranged, with the first condenser lens 12 and the second condenser lens 13 formed on both sides of a first reference line K1, crossing the optical member at right angles in the direction of its length, or the direction of the length of the rectangular opening of the reflector 8 or that of the length of the rod light source 7.

The optical member 11 is formed to hardly diffuse light from the rod light source 7 in the direction at right angles to the direction of the length of the rod light source, compared with the case where either of the first and second condenser lenses 12 and 13 is provided and to diffuse much of the light in the direction of the length of the rod light source 7.

Specifically, the first and second condenser lenses 12 and 13 having appropriately spaced tops 12a and 13a and curved lens surfaces 12b and 13b next to the tops are formed on both sides of the first reference line K1. The optical member is formed as a Fresnel lens by dividing the lens surfaces into a plurality using a plurality of concentric walls, and thus reduced in size and thickness.

As in the first embodiment, the distance between the tops 12a and 13a is set based on the longitudinal dimension of the rectangular opening the reflector 8 as measured in wide-angle imaging. The distance is set equal to or less than ½ of H2, or the longitudinal dimension of the rectangular opening of the reflector 8 as measured in wide-angle imaging, since the second embodiment is a strobe light that varies the dimension of the opening of the reflector 8 in the direction of the length of the rod light source 7 according to the light emitting angle.

To easily align the first reference line K1 with the center line of the rectangular opening of the reflector 8, which center line is in the direction of the length of the rod light source 7, when the optical member 4 is installed in front of the light emitter, the first reference line K1 is arranged so that it crosses the optical member 11 at right angles at its longitudinal center Thus the first and second condenser lenses 12 and 13 are formed so that the optical member is symmetrical about the first reference line K1. In other words, the first and second condenser lenses are formed from aspheric lenses with the same convergence characteristic.

The curved lens surfaces 12b and 13b next to the tops 12a and 13a of the first and second condenser lenses 12 and 13 are formed from aspheric lenses. The tops 12a and 13a are arranged so that they are on a second reference line K2 crossing the rectangular opening at right angles at its transverse center.

As compared with the arrangement of a known-structure Fresnel lens, provided with a condenser lens having a top and the same convergence characteristic as the first and second condenser lenses 12 and 13, the optical member 11 of the second embodiment is provided with a curved lens surface having a somewhat sharp slope at the ends of the optical member in the direction at right angles to the direction of the length of the rod light source and with a curved lens surface having a gentler slope formed at the ends of the optical member at the direction of the length of the rod light source.

This allows the second embodiment to control light from the rod light source 7 in the direction of its length in almost the same way as a strobe light using the conventional Fresnel lens when telephoto imaging is performed, and to be given luminous intensity distribution characteristics that cover the angle of convergence of imaging lenses with a short focal length, which lenses more widely diffuse light than a strobe light using the conventional Fresnel lens, when wide-angle imaging is performed.

Referring now to the luminous intensity distribution characteristic curves 8(a) and 8(b) in FIGS. 8(a) and 8(b) and the luminous intensity distribution characteristic curves 8(a) and 8(b) in FIGS. 9(a) and 9(b), all of which curves are obtained when the second embodiment has a structure describe below, the luminous intensity distribution characteristics of the second embodiment of a strobe light according to the present invention are described below.

The second embodiment 2 of a strobe light according to the present invention, which embodiment has the luminous intensity distribution characteristics shown in FIGS. 8 and 9, uses flash discharge tube 27.5 mm long and 2 mm in outside diameter as the rod light source 7.

The strobe light also uses as the optical member 11 a Fresnel lens in which the curved surfaces of the first and second condenser lenses 12 and 13 are formed with an aspheric lens surface having the same convergence characteristic as a condenser lens with a focal length of 25 mm. The Fresnel lens is 42 mm×16 mm and 2 mm thick and has tops 12a and 13a 5 mm apart from each other. A plurality of walls divide the aspheric lens surface into a plurality at intervals of 0.5 mm.

A reflector 8 having a reflecting surface which is not of a truly parabolic form but of a quasi-parabolic form and planar side reflecting surfaces, all of which surfaces are next to an rectangular opening, is made of plates 0.3 mm thick. The reflector is 10 mm deep and 17 mm long at its bottom. The shorter side dimension of the rectangular opening of the reflector is 15 mm. The longer side dimension of the opening is H1=40 mm for telephoto imaging and H2=20 mm for wide-angle imaging. The rod light source, a flash discharge tube, is arranged so that it moves between the position at a distance L1 of 1.6 mm from the bottom of the reflector and that at a distance L2 of 3.15 mm from the bottom of the reflector.

Figure 8A:
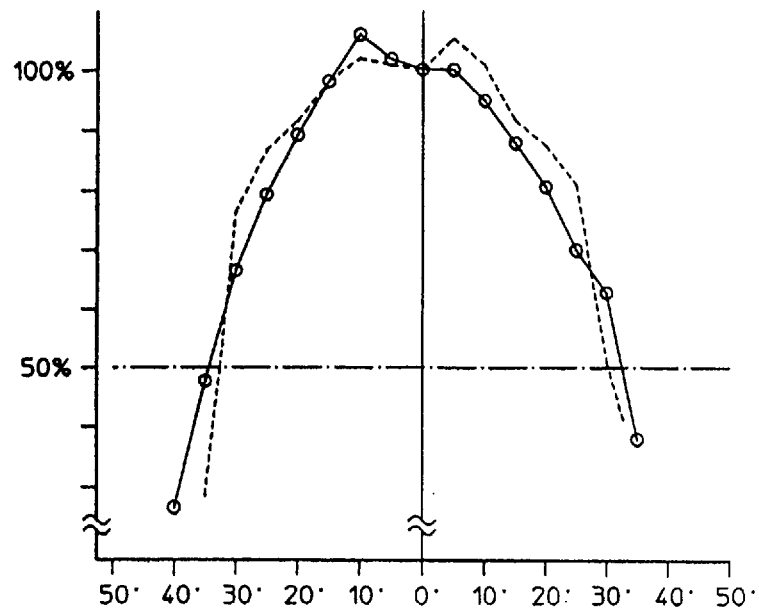
FIGS. 8(a) and 8(b) are luminous intensity distribution characteristic curves obtained with the second embodiment, curve FIG. 8(a) representing a luminous intensity distribution characteristic for the direction of the length of a rod light source, as measured during telephoto imaging, and curve FIG. 8(b) representing a luminous intensity distribution characteristic for the direction of the length of the rod light source, as measured during wide-angle imaging.
Figure 8B:
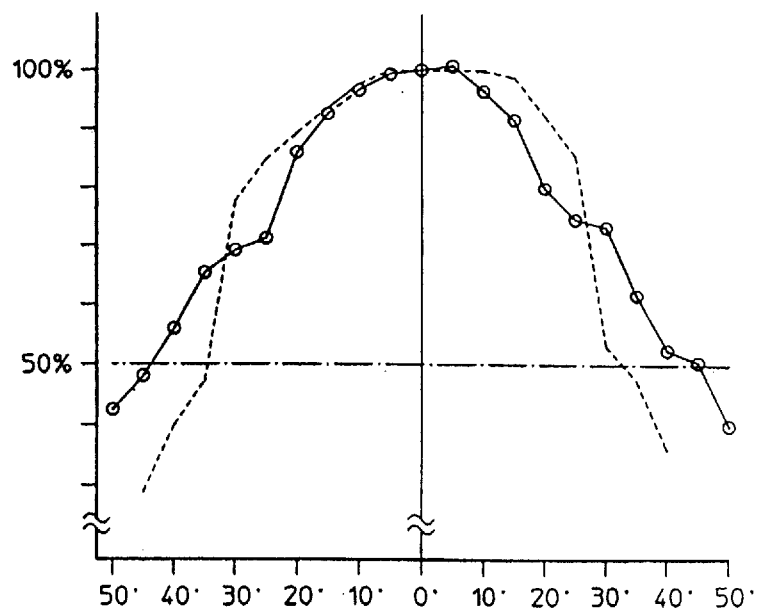
Figure 9A:
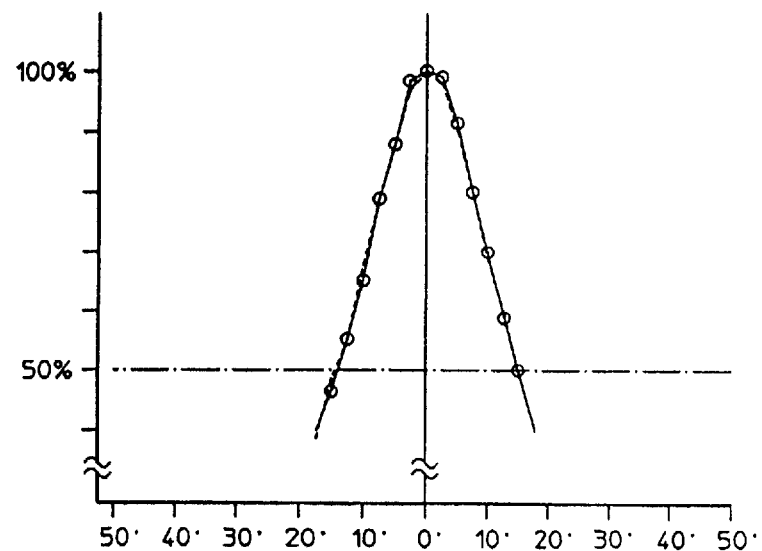
FIGS. 9(a) and 9(b) are luminous intensity distribution characteristic curves obtained with the second embodiment, curve FIG. 9(a) representing a luminous intensity distribution characteristic for the direction at right angles to the direction of the length of the rod light source, as measured during telephoto imaging, and curve FIG. 9(b) representing a luminous intensity distribution characteristic for the direction at right angles to the direction of the length of the rod light source, as measured during wide-angle imaging.
Figure 9B:
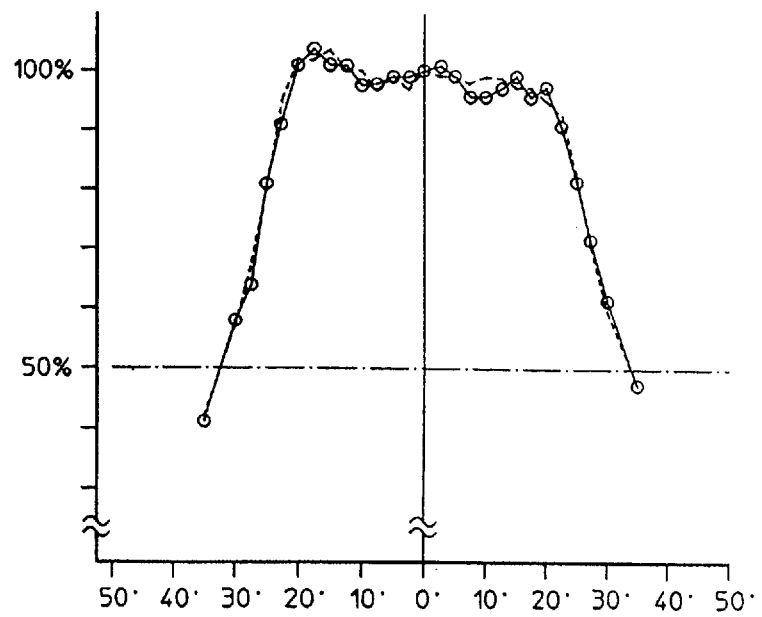

FIGS. 8(a) and 8(b) shows luminous intensity distribution characteristics in the direction of the length of the rod light source 7, and FIGS. 9(a) and 9(b) show those in the direction at right angles to the direction of the length of the rod light source 7. Curves (a) in FIGS. 8(a) and 9(a) represent luminous intensity distribution characteristics for telephoto imaging, for which the components are indicated by solid lines in FIG. 6. Curves (b) in FIGS. 8(a) and 9(b), on the other hand, represent luminous intensity distribution characteristics for wide-angle imaging, for which the components are indicated by broken lines in FIG. 6.

Curves (a) in FIG. 8(a) and curves 9(b) in FIG. 9, all of which curves are indicated by broken lines, show luminous intensity distribution characteristics obtained with a strobe light which is arranged by replacing the optical member 11 in the second embodiment with the conventional Fresnel lens having a top and the same structure as the optical member 11.

As described above referring to Table 1, the light emitting angle is an angle at which fifty percent of the oncoming light intensity is obtained. Thus Table 2 gives only angles at which fifty percent of the oncoming light intensity is obtained.

TABLE 2

| | | Left | Right | Total | Upper | Lower | Total |
|---|---|---|---|---|---|---|---|
| Telephoto imaging | Second embodiment | 34.4 | 32.5 | 66.9 | 14.0 | 15.1 | 29.1 |
| | Comparison strobe light | 32.7 | 30.2 | 62.9 | 14.3 | 14.9 | 29.2 |
| Wide-angle imaging | Second embodiment | 43.5 | 45.1 | 88.6 | 32.3 | 33.8 | 66.1 |
| | Comparison strobe light | 34.4 | 32.3 | 66.7 | 32.3 | 33.4 | 65.7 |

Unit: degree (°)

As is obvious from curves (a) and (b) in FIGS. 9(a) and 9(b) and Table 2, the second embodiment and the comparison strobe light have almost the same luminous intensity distribution characteristics for the direction at right angles to the direction of the length of the rod light source 7 no matter whether telephoto imaging or wide-angle imaging is performed.

The second embodiment's telephoto imaging luminous intensity distribution characteristics for the direction at right angles to the direction of the length of the rod light source 7 are equivalent to an upper light emitting angle of 14.0°+ a lower light emitting angle of 15.1°=29.1°, as viewed from the front, while the comparison strobe light's telephoto imaging luminous intensity distribution characteristics for the same direction are equivalent to an upper light emitting angle of 14.3°+ a lower light emitting angle of 14.9°=29.2°. On the other hand, the second embodiment's wide-angle imaging luminous intensity distribution characteristics for the direction at right angles to the direction of the length of the rod light source 7 are equivalent to an upper light emitting angle of 32.3°+ a lower light emitting angle of 33.8°=66.1°, as viewed from the front, while the comparison strobe light's wide-angle imaging luminous intensity distribution characteristics for the same direction are equivalent to an upper light emitting angle of 32.3°+ a lower light emitting angle of 33.4°=65.7°. Thus the second embodiment and the comparison strobe light do not differ much in terms of telephoto imaging and wide-angle imaging luminous intensity distribution characteristics, and both well control light from the rod light source 7.

As is clear from curve 8(a) in FIG. 8(a) and Table 2, the second embodiment and the comparison strobe light do not differ much in terms of the telephoto imaging luminous intensity distribution characteristics for the direction of the length of the rod light source 7.

Minutely speaking, the second embodiment's telephoto imaging luminous intensity distribution characteristics are equivalent to a left light emitting angle of 34.4°+ a right light emitting angle of 32.5°=66.9°, as viewed from the front, while the comparison strobe light's telephoto imaging luminous intensity distribution characteristics are equivalent to a left light emitting angle of 32.7°+ a right light emitting angle of 30.2°=62.9°. This shows that the second embodiment and the comparison strobe light achieve virtually the same control condition except that the second embodiment diffuses light a little more widely than the comparison strobe light.

As is clear from curve 8(b) in FIG. 8(b) and Table 2, the second embodiment and comparison strobe light differ much in terms of the wide-angle imaging luminous intensity distribution characteristics for the direction of the length of the rod light source 7.

Minutely speaking, the second embodiment's wide-angle imaging luminous intensity distribution characteristics are equivalent to a left light emitting of 43.5°+ a right light emitting of 45.1°=88.6°, as viewed from the front, while the comparison strobe light's wide-angle imaging luminous intensity distribution characteristics are equivalent to a left light emitting of 34.4°+ a right light emitting of 32.3°=66.7°. This shows that the second embodiment diffuses light more widely than the comparison strobe light.

Thus the second embodiment is expected to have luminous intensity distribution characteristics that cover the angle of coverage of an imaging lens with a shorter focal length.

As described above, to cope with, for example, an imaging lens with a focal length of 24 mm, whose horizontal angle of coverage is about 74°, a product must be designed in consideration of variations during production so that luminous intensity distribution characteristics can be obtained which are equivalent to a light emitting angle of about 84°.

However, since the comparison strobe light exhibits only luminous intensity distribution characteristics equivalent to a horizontal light emitting angle of 66.7° for wide-angle imaging, it cannot cover the angle of coverage of an imaging lens with a focal length of 24 mm. The second embodiment, on the other hand, exhibits luminous intensity distribution characteristics equivalent to a horizontal light emitting angle of 88.6° for wide-angle imaging, and thus covers an imaging lens with a focal length of 24 mm.

As is the case with the first embodiment, the inventor has confirmed the following regarding the second embodiment:

(1) Providing the optical member 11 with curved lens surfaces having the tops 12a and 13a makes larger the wide-angle imaging light emitting angle in the direction of the length of the rod light source 7, compared with the comparison strobe light using an optical member having only one top.

(2) Almost the same luminous intensity distribution characteristics can be obtained with rod light sources 7 and reflectors 8 of different sizes.

(3) Increasing the distance between the tops 12a and 13a benefits the light emitting angle only. However, as the distance between the tops increases, brightness slightly decreases. When the distance exceeds a certain value, the luminous intensity distribution curve becomes unfavorable in part.

Figure 10:
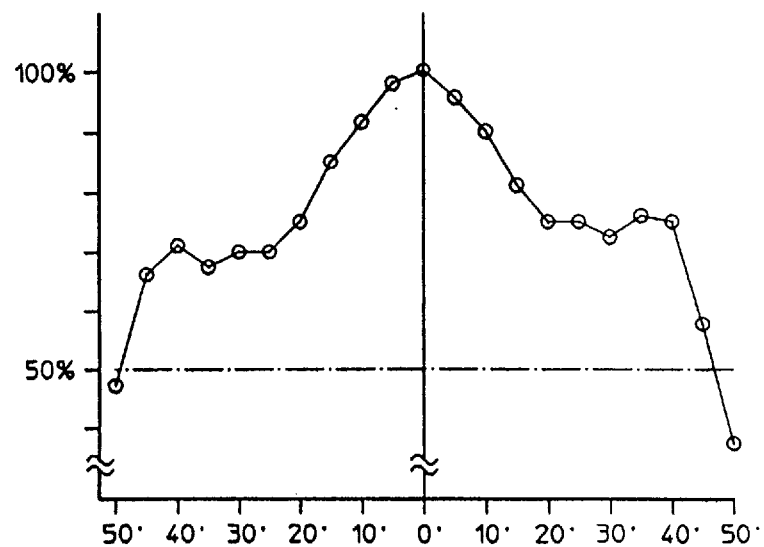
FIG. 10 is a luminous intensity distribution characteristic curve for the direction of the length of the rod light source, obtained with the second embodiment using an optical member whose tops are farther apart from each other than the tops of the optical member with which curve (b) in FIG. 8 is obtained.

For reference, FIG. 10 shows the wide-angle imaging luminous intensity distribution characteristics of an optical member having tops 10 mm apart from each other for the direction of the length of the rod light source 7. As shown in the FIG., only the light emitting angle is larger, compared with the second embodiment having the optical member with the tops 5 mm apart from each other, but part of the luminous intensity distribution curve of the FIG. is particularly gentle.

When the distance between the tops further increases, the luminous intensity distribution curve changes to a one having a second peak where the above-mentioned gentle part has an area with higher light intensity at a location outer from the directly opposing direction. It goes without saying that the luminous intensity distribution curve with the second peak is not preferable, since the luminous intensity distribution characteristics represented by the curve cause uneven brightness during imaging.

To diffuse light from the rod light source 7 widely in the direction of its length, especially during wide-angle imaging, the distance between the tops is preferably set to be 10 mm or less when the longitudinal dimension H2 of the opening of the reflector 8 is 20 mm; that is, equal to or less than ½ of the longitudinal dimension of the opening of the reflector 8.

The inventor has also confirmed that the distance between the tops should be set from 0.2 to 0.4, with the longitudinal dimension of the opening of the reflector 8 assumed to be 1, to obtain luminous density distribution characteristics covering an imaging lens with a focal length of 24 mm.

As described above, the second embodiment of a strobe light according to the present invention comprises an optical member, provided with first and second condenser lenses which hardly diffuse light from a rod light source during telephoto imaging during which the distance between the source and the optical member is large and widely diffuse the light during wide-angle imaging during which the distance above is small, and means for varying the light emitting angle. This means that the second embodiment does not diffuse light from the rod light source in the direction of its length during telephoto imaging and sufficiently diffuses the light in the direction during wide-angle imaging. Thus the second embodiment exhibits luminous density distribution characteristics including a light emitting angle which is large enough to cover an imaging lens with a large angle of coverage during wide-angle imaging.

In the second embodiment, the tops 12a and 13a of the optical member 11 do not always need to be positioned on the second reference line K2. Taking desired luminous intensity distribution characteristics into account, the tops 12a and 13a may be positioned above or below the second reference line K2. If it is extremely difficult to produce the optical member 11 as a Fresnel lens, the first and second condenser lenses 12 and 13 may be arranged as a curved lens surface.

Figure 11:
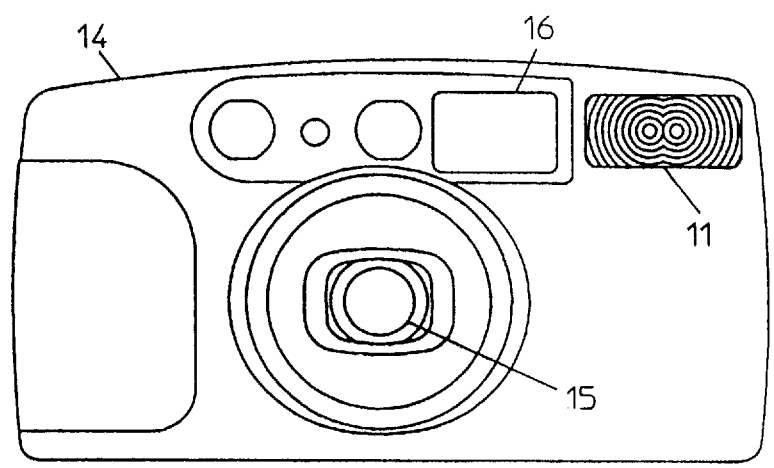
FIG. 11 is a schematic front view of an embodiment of an image recorder according to the present invention.

FIG. 11 is a schematic front view illustrating an embodiment of an image recorder according to the present invention. Components designated by the same numerals as in FIG. 1 have the same function.

Image recorders according to the present invention basically contain a strobe light as described referring to the first and second embodiments.

The image recorder 14 in FIG. 11 is a known photographic camera using silver film as a photosensitive material. To the right of a finder 16, which is positioned above an imaging lens 15, for example, a zoom lens whose focal length can be varied, as viewed from the front; that is, to the upper right of the imaging lens 15 substantially in the center of the camera body, a light emitter is positioned which includes the optical member 11 of the strobe light described above referring to the second embodiment.

The image recorder 14 varies the position of the rod light source with respect to the optical member 11 and the dimensions of the opening of a reflector according as the focal length of the imaging lens 15 varies. The focal length variation allows image recording, or "imaging," to be performed based on such luminous intensity distribution characteristics that light from the rod light source is not diffused widely during telephoto imaging but sufficiently diffused during wade-angle imaging.

This, in turn, means that the image recorder 14 can perform imaging based on a diversity of luminous intensity distribution characteristics covering not only landscape-image recording but imaging using lenses with a large angle of coverage and a short focal length.

For example, means of FIGS. 12(a) and 12(b) and 13 may be used as means for varying the light emitting angle for the strobe light of the image recorder 14.

The position of the light emitter including the optical member of the strobe light, described referring to the second embodiment, with respect to the imaging lens 15 is not limited to the position indicated in FIG. 11. The light emitter may be positioned over the imaging lens or to the upper left of the imaging lens.

The first reference line K1 of the optical member 11 does not need to be positioned so that the line crossed the optical member at right angles at its longitudinal center or to be aligned with a straight line crossing the reflector opening at its center in the direction of the length of the rod light source. The tops 12a and 13a do not always need to be positioned on the second reference line K2 described above.

In other words, taking into account the position of the optical member 11 with respect to the imaging lens 15 and desired luminous intensity distribution characteristics, the first reference line K1, for example, may be arranged so that it crosses the optical member 11 at a position other than the longitudinal center of the optical member. Alternatively, the first reference line K1 may be positioned so that it does not align with a straight line crossing the reflector opening at its center in the direction of the length of the rod light source. The tops 12a and 13a may be positioned above or below the second reference line K2.

As mentioned earlier in the present specification, an image recorder according to the present invention may be arranged by containing a strobe light, described referring to the second embodiment, in an "electric camera" using electric elements as a photosensitive material.

We claim:

1. A strobe light, which changes the angle at which light from a light source illuminates an object, comprising at least a light emitter consisting of a reflector provided with a reflecting surface which is not of a truly parabolic form but of a quasi-parabolic form and planar side reflecting surfaces, all of which surfaces are next to a rectangular opening, and of a rod light source positioned in space formed by the reflecting surface which is not of a truly parabolic form but of a quasi-parabolic form and the planar side reflecting surfaces; an optical member positioned in front of the reflector, first and second condenser lenses said optical member are formed on both sides of a first reference line crossing the rod light source at right angles substantially at its center in its Longitudinal direction; and light emitting angle varying means for varying the angle of light emitted through the optical member from the light emitter, characterized in that:

the optical member is arranged to hardly diffuse light from the rod light source in the direction at right angles to the direction of the length of the rod light source and widely diffuses the light in the direction of the length of the rod light source, compared with the case where the optical member has either the first condenser lens or the second condenser lens.

2. A strobe light, which changes the angle at which light from a light source illuminates an object, comprising at least a light emitter consisting of a reflector provided with a reflecting surface which is not of a truly parabolic form but of a quasi-parabolic form and planar side reflecting surfaces, all of which surfaces are next to a rectangular opening, and of a rod light source positioned in space formed by the reflecting surface which is not of a truly parabolic form but of a quasi-parabolic form and the planar side reflecting surfaces; an optical member positioned in front of the reflector, first and second condenser lenses said optical member are formed on both sides of a first reference line crossing the rod light source at right angles substantially at its center in its longitudinal direction; and light emitting angle varying means for varying the angle of light emitted through the optical member from the light emitter, characterized in that:

the optical member is arranged to hardly diffuse light from the rod light source in the direction at right angles to the direction of the length of the rod light source when the distance between the rod light source and the optical member is long and widely diffuses the light when the distance is short.

3. A strobe light, which changes the angle at which light from a light source illuminates an object, comprising at least a light emitter consisting of a reflector provided with a reflecting surface which is not of a truly parabolic form but of a quasi-parabolic form and planar side reflecting surfaces, all of which surfaces are next to a rectangular opening, and of a rod light source positioned in space formed by the reflecting surface which is not of a truly parabolic form but of a quasi-parabolic form and the planar side reflecting surfaces; an optical member positioned in front of the reflector, first and second condenser lenses said optical member are formed on both sides of a first reference line crossing the rod light source at right angles substantially at its center in its longitudinal direction; and light emitting angle varying means for varying the angle of light emitted through the optical member from the light emitter, characterized in that:

the first and second condenser lenses are arranged to have tops, positioned apart from each other by ½ or less of the longitudinal dimension of the rectangular opening of the reflector as measured during wide-angle imaging, and curved lens surfaces next to the tops.

4. A strobe light according to any of claim 1, wherein the optical member is positioned in front of the reflector so that the first reference line crosses the reflector opening at the center thereof in the direction of the length of the rod light source.

5. A strobe light according to claim 1, wherein the first reference line of the optical member crosses the rod light source at right angles at its center in its longitudinal direction, and the first and second condenser lenses are symmetrical about the first reference line.

6. A strobe light according to claim 1, wherein the first and second condenser lenses each has at least a first optics portion having a top and a first convergence characteristic, and a second optics portion having a second convergence characteristic which differs from the first convergence characteristic, said second optics portion being next to the first optics portion.

7. A strobe light according to claim 3, wherein the tops of the first and second condenser lenses are positioned on a second reference line crossing the rectangular opening of the reflector at right angles at its center in the direction at right angles to the direction of the length of the rod light source.

8. A strobe light according to claim 3, wherein the distance between the tops is set from 0.2 to 0.4, assuming that the longitudinal dimension of the rectangular opening of the reflector is 1 during wide-angle imaging.

9. A strobe light according to claim 3, wherein the first and second condenser lenses are arranged by dividing the curved lens surfaces thereof into a plurality using a plurality of concentric walls.

10. A strobe light according to claim 3, wherein the curved lens surfaces are formed with aspheric lens surfaces.

11. A strobe light according to claim 1, wherein the light emitting angle varying means are arranged to have a moving mechanism for moving at least the light emitter and move the light emitter to vary the positional relationship between the light emitter and the optical member, thereby changing the distance between the light emitter and the optical member so that the light emitting angle varies.

12. A strobe light according to claim 1, wherein the light emitting angle varying means are arranged to have a moving mechanism for moving at least the rod light source and move the rod light source to vary the position of the rod light source with respect to the optical member or reflector, thereby changing the distance between the optical member or the reflector and the rod light source so that the light emitting angle varies.

13. A strobe light according to claim 1, wherein the light emitting varying means are arranged to have a moving mechanism for moving at least the rod light source and reflector and move the rod light source and reflector to vary the position of the rod light source with respect to the optical member or the reflector and the dimension of the opening of the reflector in the direction of the length of the rod light source at the same time, thereby changing the distance between the optical member or the reflector and the rod light source and the dimension of the opening of the reflector so that the light emitting angle varies.

14. An image recorder recording an image corresponding to an object to be imaged, said recorder containing the strobe light according to claim 1, characterized in that:
the strobe light is arranged to operate to light up the object to be imaged.

15. An image recorder recording an image corresponding to an object to be imaged, said recorder containing the strobe light according to claim 2, characterized in that:
the strobe light is arranged to operate to light up the object to be imaged.

16. An image recorder recording an image corresponding to an object to be imaged, said recorder containing the strobe light according to claim 3, characterized in that:
the strobe light is arranged to operate to light up the object to be imaged.

17. An image recorder according to claim 14, wherein the first and second condenser lenses of the optical member in the strobe light each has at least a first optics portion having a top and a first convergence characteristic, and a second optics portion having a second convergence characteristic which differs from the first convergence characteristic, said second optics portion being next to the first optics portion.

18. An image recorder according to claim 14, wherein the light emitting angle varying means in the strobe light are arranged to have a moving mechanism for moving at least the light emitter and move the light emitter to vary the positional relationship between the light emitter and the optical member, thereby changing the distance between the light emitter and the optical member so that the light emitting angle varies.

19. An image recorder according to claim 14, wherein the light emitting angle varying means in the strobe light are arranged to have a moving mechanism for moving at least the rod light source and move the rod light source to vary the position of the rod light source with respect to the optical member or reflector, thereby changing the distance between the optical member or the reflector and the rod light source so that the light emitting angle varies.

20. An image recorder according to claim 14, wherein the light emitting varying means in the strobe light are arranged to have a moving mechanism for moving at least the rod light source and reflector and move the rod light source and reflector to vary the position of the rod light source with respect to the optical member or the reflector and the dimension of the opening of the reflector in the direction of the length of the rod light source at the same time, thereby changing the distance between the optical member or the reflector and the rod light source and the dimension of the opening of the reflector so that the light emitting angle varies.

* * * * *